June 9, 1931. L. SHUMAN 1,809,077
ELECTRIC WATER HEATER
Filed Dec. 30, 1927
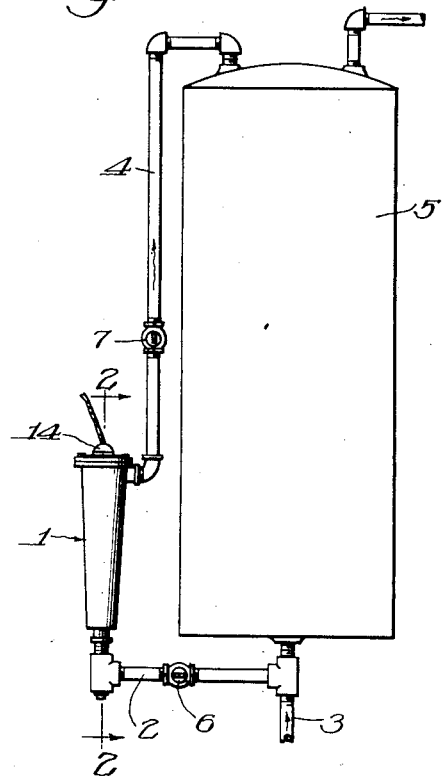
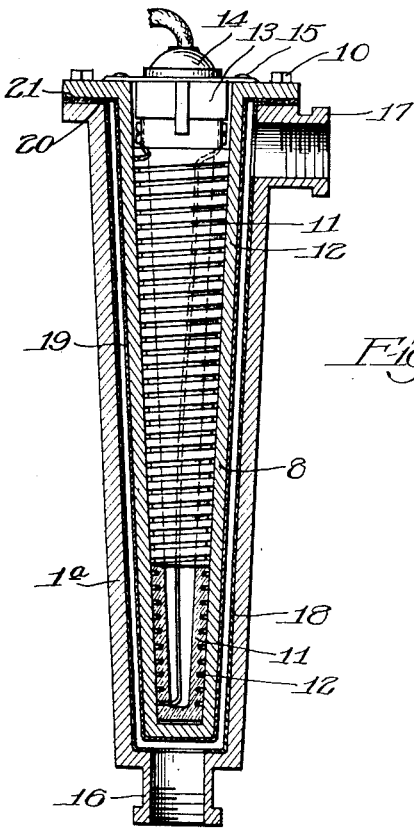
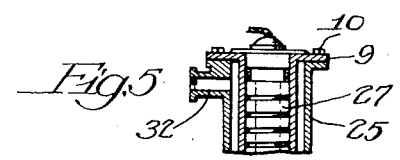
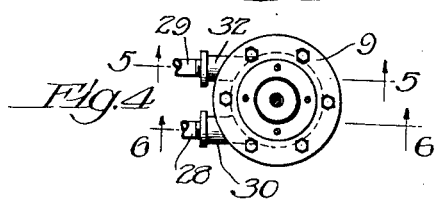
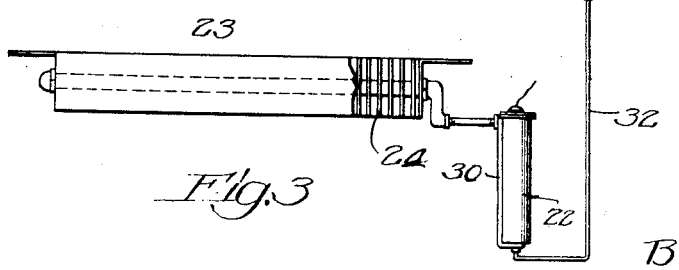
Inventor:
Leo Shuman
By Parker & Carter Attys.

Patented June 9, 1931

1,809,077

UNITED STATES PATENT OFFICE

LEO SHUMAN, OF SPOKANE, WASHINGTON, ASSIGNOR, BY MESNE ASSIGNMENTS, TO CONTINENTAL MANUFACTURING COMPANY, A CORPORATION OF WASHINGTON

ELECTRIC WATER HEATER

Application filed December 30, 1927. Serial No. 243,507.

This invention relates to an electric water heater and has for its object to provide a new and improved water heater of this description. The invention has as a further object to provide an electric water heater which shall be simple in construction and efficient in operation. The invention has as a further object to provide an electric water heater arranged so that deposits of solid material on the effective surfaces of the heater may be easily, quickly and efficiently removed. The invention has other objects which are more particularly pointed out in the accompanying description.

Referring now to the drawings,—

Figure 1 is a view showing one form of heater embodying the invention connected with a hot water tank;

Fig. 2 is an enlarged sectional view taken on line 2—2 of Fig. 1;

Fig. 3 is a view in part section, showing the electric heater applied to a hot water radiator;

Fig. 4 is an enlarged plan view of the electric water heater shown in Fig. 3;

Fig. 5 is a sectional view with parts omitted, taken on line 5—5 of Fig. 4;

Fig. 6 is an enlarged sectional view taken on line 6—6 of Fig. 3.

Like numbers refer to like parts throughout the several figures.

Referring now to Figs. 1 and 2, there is shown an electric water heater 1, connected by pipes 2 and 3 with a source of water supply and by a pipe 4 with a hot water tank 5. Valves 6 and 7 are provided for shutting off the water when desired. The electric water heater illustrated in Figs. 1 and 2 has an outer casing 1ª and an inner casing 8, the two casings being separated by a water space. The inner casing 8 is provided with a laterally extending flange 9, by means of which it is fastened to the outer casing 1ª so as to provide a watertight joint. As illustrated, there are provided fastening devices 10 for this purpose. Both of the casings are open at one end as shown. Within the inner casing 8 is an electric heating element, which may be made up in any desired manner, and which is removably held in the inner casing.

In the construction shown, this electric heating element consists of the resistance wire 11, wound about the insulating material 12. The insulating material is provided with grooves in which the wire is received, the grooves being of such depth that the wires will not engage the inner casing 8. The wire may be associated with the insulating material in any other desired manner. The ends of the wire are connected to the plug 13, and are arranged so that connection may be made to an electric circuit by means of a removable plug 14. The heating element is removably attached to the inner casing 8 by the removable fastening pieces 15.

The outer casing 1ª is provided with an inlet 16 and an outlet 17. The water to be heated passes in the inlet 16, up around the heating element, and out the outlet 17. It will be seen that the heating element can be easily and quickly removed for repair or renewal without interfering with the water connection, as it is only necessary to remove the fastening devices 15 and pull the heating element out of the inner casing 8. This in no manner affects the water connection or the flow of the water through the heater.

The water to be heated in many instances contains material, such as lime, which is deposited on the heating element and associated parts, thereby greatly decreasing the efficiency of the heater and in some instances rendering it practically inoperative. This invention provides means for remedying this condition. When the device is to be used in connection with water which produces these deposits, the outer casing 1ª is provided with a thin, removable lining 18 and the inner casing 8 is provided with a thin, removable cover 19. The lining 18 is preferably provided with a laterally projecting flange 20, and the cover 19 with a laterally projecting flange 21, these flanges extending between the flange 9 and the top of the outer casing 1ª. When lime or other material is deposited thereon, it is only necessary to shut off the water and remove the heating element from the casing 1ª and then remove the parts 18 and 19; the deposits are then removed from these parts and the parts replaced. I prefer to make these parts of thin copper, so that they can be hammered so as to remove the deposit and then straightened easily in the event they should be distorted. When they are hammered, due to their elasticity, the coating of deposited material is easily broken and removed.

In Fig. 3 I have shown a construction wherein an electric heater 22 is connected with a coil 23 of a hot water radiator. This coil may be of any desired form and I have illustrated it as being provided with a series of heat radiating fins 24 inclosed within a suitable casing. The electric heater, in this instance, consists of the outer casing 25 and the inner casing 26 containing the electric heating element 27. The radiator is provided with two connections, 28 and 29. The connection 28 is connected with the inlet 30 of the radiator, which passes down along the side of the heater and connects with the inlet opening 31. The other connection 29 is connected with the outlet 32 of the heater. In the construction shown, a glass receptacle 31 is connected by a pipe 32 with the bottom of the heater. This acts as an expansion tank and may simply consist of an ordinary glass fruit jar having a removable cover 33.

The heaters may be made smaller, if desired, so that each radiator may be supplied with a heater, or the heater may be large so that it will supply a number of radiators.

The use and operation of my invention are as follows:

When the heater is in use it is connected in the water circuit so that the water flows from the inlet into the space between the outer and inner casings and then out through the outlet. In the construction of Figs. 1 and 2 the casings are larger at one end than at the other and the water is slowed up in traveling through the heater, so that it will have time to be heated. In the construction shown in Figs. 3 to 6, this same result is secured by having the cross-section of the water space larger than the inlet. When the device is used with water containing material that is deposited, the lining 18 and cover 19 are easily and quickly removed, when the deposit forms thereon, and this deposit removed.

It will be seen that I have here a simple electric heating device which can be easily and cheaply made and installed, and which can be used with water containing material that deposits in the heater without materially reducing the efficiency of the heater, as this deposit can be easily and quickly removed.

I claim:

1. An electric water heater comprising an outer casing open at one end, a hollow inner casing open at one end and provided with a laterally extending flange which engages the end of the outer casing, removable fastening devices engaging said laterally extending flange and the end of the outer casing for connecting the inner casing with the outer casing to form a water-tight joint, a heating element inserted in the open end of the inner casing and supported on the interior of said hollow inner casing, the inner and outer casing being separated by a water space, the outer casing being provided with an inlet and an outlet communicating with said water space and an electrical connection by means of which said heating element may be connected in an electric circuit.

2. An electric water heater comprising an outer casing, a hollow inner casing separated from the outer casing by a water space, an electric heating element on the interior of the inner casing, and means for preventing material from being deposited on the inner casing.

3. An electric water heater comprising an outer casing, a hollow inner casing separated from the outer casing by a water space, a water inlet and outlet communicating with said water space, an electric heating element on the interior of the inner casing, and a removable deposit receiving cover for the inner casing which receives solid material which may be deposited from the water while it is being heated.

4. An electric water heater comprising an outer casing, a hollow inner casing separated from the outer casing by a water space, an electric heating element in the inner casing, and a removable cover for the inner casing which receives solid material which may be deposited from the water while it is being heated, and an opposed removable lining for the inside of the outer casing for receiving material which may be deposited from the water while being heated.

5. An electric water heater comprising an outer casing open at its upper end, an inner casing separated from the outer casing by a water space and also open at its upper end, a water-tight connection between the two casings, a heating element removably received in and supported upon the interior of said inner casing whereby the weight of the inner casing and the heating element assist in holding them in place in the outer casing.

6. An electric water heater comprising an outer casing open at its upper end, a hollow inner casing separated from the outer casing by a water space and also open at its upper end, a water-tight connection between the two casings, a heating element removably received in and supported upon the interior of said inner casing, said outer casing having an inlet at its lower end in alignment with the center of the inner casing and an outlet at one side near the upper end thereof, said inlet and outlet communicating with said water space.

7. An electric water heater comprising an outer and a hollow inner casing both open at one end and having flanges on their open ends, said casing decreasing in cross sectional area from the flanged ends toward the other ends, the inner casings smaller than the outer casing so as to leave a space between the removable fastening devices extending through the flange of one casing and projecting into the flange of the other casing and a heating element tapering from one end toward the other, removably received in the interior of the inner casing, the outer casing being provided with an inlet and an outlet communicating with the space between the casings.

Signed at Chicago, county of Cook and State of Illinois, this 21st day of December, 1927.

LEO SHUMAN.